(12) United States Patent
Shao et al.

(10) Patent No.: US 6,633,145 B2
(45) Date of Patent: Oct. 14, 2003

(54) CIRCUIT FOR IMPROVED BACK EMF DETECTION

(75) Inventors: Jianwen Shao, Schaumburg, IL (US); Dennis C. Nolan, Elk Grove Village, IL (US); Kwan A. Haughton, Bartlett, IL (US); Thomas L. Hopkins, Mundelein, IL (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/991,325

(22) Filed: Nov. 20, 2001

(65) Prior Publication Data

US 2003/0098666 A1 May 29, 2003

(51) Int. Cl.[7] ................................................. H02P 1/18
(52) U.S. Cl. ........................ 318/254; 318/459; 318/500; 318/599; 318/138; 318/439; 388/928.1; 388/804; 388/806; 388/811; 388/822
(58) Field of Search ............................... 318/254, 138, 318/439, 599, 459, 500; 388/804, 805–806, 811–815, 819–823, 928.1

(56) References Cited

U.S. PATENT DOCUMENTS

| | | | | |
|---|---|---|---|---|
| 4,743,815 A | * | 5/1988 | Gee et al. | 318/254 |
| 5,367,234 A | * | 11/1994 | DiTucci | 318/254 |
| 5,517,095 A | * | 5/1996 | Carobolante et al. | 318/254 |
| 5,663,618 A | * | 9/1997 | Adachi et al. | 318/254 |
| 5,767,654 A | * | 6/1998 | Menegoli et al. | 318/254 |
| 5,783,917 A | * | 7/1998 | Takekawa | 318/439 |
| 5,838,128 A | | 11/1998 | Maiocchi et al. | |
| 5,859,520 A | | 1/1999 | Bourgeois et al. | |
| 5,866,998 A | | 2/1999 | Menegoli | |
| 5,909,095 A | | 6/1999 | Sakti et al. | |
| 5,929,577 A | * | 7/1999 | Neidorff et al. | 318/254 |
| 6,094,022 A | | 7/2000 | Schillaci et al. | |
| 6,252,362 B1 | * | 6/2001 | White et al. | 318/254 |

* cited by examiner

Primary Examiner—Bentsu Ro
Assistant Examiner—Rina I. Duda
(74) Attorney, Agent, or Firm—Lisa K. Jorgenson; Bryan A. Santarelli

(57) ABSTRACT

A system and method of advancing the commutation sequence of a brushless DC motor is provided. The motor having a plurality of coils, each of the coils coupled together at one end to a common center tap and coupled at an opposite end, through a respective coil tap, to both a source voltage and ground via selectively actuateable switches having diodes coupled in parallel therewith. The motor operates in a pulse width modulation (PWM) mode having PWM-on states and PWM-off states. During PWM-off states, a coil tap voltage from the coil tap of a floating phase is provided to a preconditioning circuit. The preconditioning circuit adjusts the floating phase coil tap voltage to compensate for an amount of voltage substantially equal to an amount of voltage by which a voltage at the center tap deviates from zero. The preconditioning circuit further includes sharpening circuitry for amplifying the adjusted floating phase coil tap voltage. A signal output from the preconditioning circuit is provided to a zero-crossing detection circuit for detecting zero-crossing and determining when to advance in the commutation sequence.

26 Claims, 7 Drawing Sheets

CIRCUIT FOR IMPROVED BACK EMF DETECTION

BACKGROUND OF THE INVENTION

1. Technical Field

The present invention relates to motor driving and control circuitry, and is more specifically related to an improved circuit and method for back electromotive force (BEMF) detection in a brushless motor.

2. Discussion of Related Art

Three-phase brushless DC motors have many uses, among which include both high speed and low speed applications. Conventional high speed applications include spindle motors for computer hard disk drivers, digital video disk (DVD) drivers, CD players, tape-drives for video recorders, and blowers for vacuum cleaners. Motor for high speed applications typically operate in a range from a few thousand rotations per minute (rpm's) to 20,000 rpm's, for example. Low speed applications include motors for farm and construction equipment, HVAC compressors, fuel pumps and the like. Motor for low speed applications typically operate in a range from less than a few hundred rpm's to a few thousand rpm's, for example. Compared to DC motors employing brushes, brushless DC motors enjoy reduced noise generation and improved reliability because no brushes need to be replaced due to wear.

FIG. 1 shows a cross-section of a typical brushless, DC motor 10. The motor 10 includes a permanent magnet rotor 12 and a stator 14 having a number of windings (A, B, C shown in FIG. 2). The windings are each formed in a plurality of slots 18. The motor 10 illustrated has the rotor 12 housed within the stator 14. The stator 14 may also be housed within the rotor 12. The rotor 12 is permanently magnetized, and turns to align its own magnetic flux with one generated by the windings.

Power to the motor 10 is often provided in a pulse width modulation (PWM) mode. The PWM mode is a nonlinear mode of power supply in which the power is switched on and off at a very high frequency in comparison to the angular velocity of the rotor. For example, typical switching frequencies may be in the range of 20 kHz. In a typical on-off cycle lasting about 50 $\mu$s, there may be 40 $\mu$s of "on" time followed by 10 $\mu$s of "off" time. Given the short duration of off times, current still flows through the motor windings so there is virtually no measurable slow down in the angular velocity of the rotor 12 during these periods. Accordingly, PWM mode provides a significant power savings advantage over modes in which power is continuously supplied.

In order to operate the motor 10, the flux existing in the stator 14 is controlled to be slightly in advance of the rotor 12 thereby continually pulling the rotor forward. Alternatively, the flux in the stator 14 may be controlled to be just behind the rotor 12, in which case the polarity is set such as to repel the rotor 12, thereby aiding rotation. Therefore, to optimize the efficiency of the motor 10, it is advantageous to monitor the position of the rotor 12 so that the flux in the stator 14 may be appropriately controlled and switched from one stage to the next. If the rotor 12 movement and the flux rotation should ever get out of synchronization, the rotor 12 may become less efficient, start to jitter or stop turning.

A conventional motor can be represented in circuit form as having three coils A, B, and C connected in a "Wye" or "Y" configuration, as shown by reference numeral 20 in FIG. 2, although a larger number of stator coils are often employed with multiple rotor poles. Typically, in such applications, eight-pole motors are used having twelve stator windings and four N-S magnetic sets on the rotor, resulting in four electrical cycles per revolution of the rotor. The stator coils, however, can be analyzed in terms of three "Y" connected coils, connected in three sets of four coils, each physically separated by 90 degrees.

In operation, coils A, B and C are energized with a PWM drive signal that causes electromagnetic fields to develop about the coils. The resulting attraction/repulsion between the electromagnetic fields of the coils A, B, and C and the magnetic fields created by the magnets in the motor causes the rotor assembly of the motor to rotate.

The coils are energized in sequences to produce a current path through two coils of the "Y", with the third coil left floating (or in tristate), hereinafter floating coil FC. The sequences are arranged so that as the current paths are changed, or commutated, one of the coils of the current path is switched to float, and the previously floating coil is switched into the current path. The sequences are defined such that when the floating coil is switched into the current path, the direction of the current in the coil that was included in the prior current path is not changed. In this manner, six commutation sequences, or phases, are defined for each electrical cycle in a three phase motor, as shown in Table A.

TABLE A

| Phase | Current Flows From: | Current Flows To: | Floating Coil |
|---|---|---|---|
| 1 | A | B | C |
| 2 | A | C | B |
| 3 | B | C | A |
| 4 | B | A | C |
| 5 | C | A | B |
| 6 | C | B | A |

When the motor is on, the rotation of the rotor induces a BEMF voltage in each of the windings of the motor. Such BEMF is represented by the Bemf voltage sources in FIG. 2. With respect to whichever phase is currently floating, the BEMF in that phase is monitored to determine when to advance in the communication sequence. More particularly, the BEMF in the floating coil is monitored to determine when it crosses zero at which point the position of the rotor is assumed to be known. The point at which the BEMF crosses zero is referred to as the "zero-crossing". Each time a zero-crossing is detected, the motor advances in its commutation sequence by 30 electrical degrees.

A conventional technique to measure the BEMF is to measure, during a floating period, the voltage at a coil tap (nodes Va, Vb, and Vc. in FIG. 2) for the floating coil. The measured voltage at the coil tap is presumed to be the BEMF. Accordingly, the coil tap voltage for the floating coil is monitored to detect zero-crossings at which times the commutation sequence is advanced. However, unless the center tap voltage $V_{CT}$ is zero, this BEMF calculation is not fully accurate.

Known methods of detecting BEFM include comparing the floating phase coil tap voltage with the center tap voltage, or a virtual center tap voltage configured by a resistor network. During the PWM-on and PWM-off states, the center tap voltage $V_{CT}$ is significantly deviated from zero. This generates high common mode noise. To offset the center tap voltage $V_{CT}$ for zero-crossing detection, voltage divider and filter circuits have been used. However, such voltage divider and filter circuits reduce the sensitivity of the circuits and delay zero-crossing detection.

SUMMARY OF THE INVENTION

A system and method of advancing the commutation sequence of a brushless DC motor is provided. The system and method advantageously monitors for zero crossing detections during PWM-off states. Because a PWM signal typically oscillates at a frequency significantly greater than the frequency at which the commutation sequence advances, zero-crossings which may happen to begin during a PWM-on state are still detectable during the PWM-off state with minimal delay. For example, the frequency of the PWM signal may be in the range of 20 kHz–100 kHz while the frequency at which the commutation sequence advances is typically on the order of 100 Hz. Accordingly, timely advancement of the commutation sequence is minimally impacted if the zero-crossing begins to occur during a PWM-on state. Further, as zero-crossing detection is accomplished during PWM-off states, the filter circuits previously used to offset the center tap voltage for zero-crossing detection are no longer needed, thereby avoiding reduced circuit sensitivity and delays in zero-crossing detection.

It has been observed that, especially in low speed and/or low voltage applications, variations in the center tap voltage $V_{CT}$ from zero during PWM-off states may have an adverse effect on zero-crossing detection. Variations in the center tap voltage $V_{CT}$ from a zero often occur during PWM-off states due to voltage drops across diodes in each coil of the motor. The diodes are typically connected in parallel with the switches which couple the coils to Vdc and ground. Accordingly, the present invention further provides a zero-crossing precondition circuit which adjusts for variances in BEMF measurements which occur due to a non-zero center tap voltage during PWM-off states.

According to an additional embodiment of the invention, the precondition circuitry additionally and/or alternatively includes sharpening circuitry for sharpening a coil tap voltage of the floating coil as the coil tap voltage approaches the zero-crossing. Again, particularly in low voltage and low speed motor applications, it has been observed that the coil tap voltage varies at a slow rate as it passes through the zero-crossing. Due to standard deviations/offsets in a comparator or other circuitry used to monitor for a zero-crossing (hereinafter "zero-crossing detection circuitry"), a zero-crossing detection may be triggered either earlier or later than the actual zero-crossing. Accordingly, by sharpening the coil tap voltage in comparison to the standard deviations/offset of the zero-crossing detection circuitry, a more accurate zero-crossing detection is made possible.

Thus, according to one embodiment of the present invention, a driver circuit for a brushless motor is provided. The driver circuit includes a first coil coupled between a first coil tap and a center tap, a second coil coupled between a second coil tap and the center tap, and a third coil coupled between a third coil tap and the center tap. The driver circuit operating in a pulse width modulation (PWM) mode having a PWM-on state and a PWM-off state. The driver circuit includes a precondition circuit configured to receive, during a PWM-off period, a floating phase coil tap voltage from one of the first coil tap, the second coil tap and the third coil tap. The precondition circuit is configured to precondition the floating phase coil tap voltage for zero-crossing detection. The driver circuit further includes zero-crossing detection circuitry configured to receive the preconditioned floating phase coil tap voltage and determine when a zero-crossing event has occurred.

According to another embodiment of the present invention, a method for determining when to advance in a commutation sequence of a brushless DC motor is provided. The motor including a first phase having a first coil coupled between a first coil tap and a center tap, a second phase having a second coil coupled between a second coil tap and the center tap, and a third phase having a third coil coupled between a third coil tap and the center tap. The method includes the steps of: providing to the motor a pulse width modulation (PWM) signal having a PWM-on state and a PWM-off state; during the PWM-off state, supplying a floating phase coil-tap voltage from a floating one of the first, second and third phases of the motor to a preconditioning circuit; performing by the preconditioning circuit, preconditioning to the floating phase coil-tap voltage; monitoring for a zero-crossing of the preconditioned floating phase coil-tap voltage; and when a zero-crossing is detected, advancing a step in the commutation sequence of the motor.

According to yet another embodiment of the present invention, a motor is provided. The motor includes a plurality of coils, coupled together in one of a delta or wye configuration, each of the coils coupled at one end, through a respective coil tap, to both a source voltage and ground via selectively actuateable switches. Each of the switches includes a diode coupled in parallel with the respective switch. The motor includes a preconditioning circuit, the preconditioning circuit configured to adjust a voltage received from an associated one of the coil taps by an amount of voltage substantially equal to an amount of voltage by which the diodes offset a voltage at the center tap from zero, and a zero-crossing detection circuit coupled to the precondition circuit for receiving a signal output from the preconditioning circuit and monitoring the signal to detect a zero-crossing.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

The present invention will now be described with reference to the drawings, wherein like reference labels are used to refer to like elements throughout.

Figure 1:
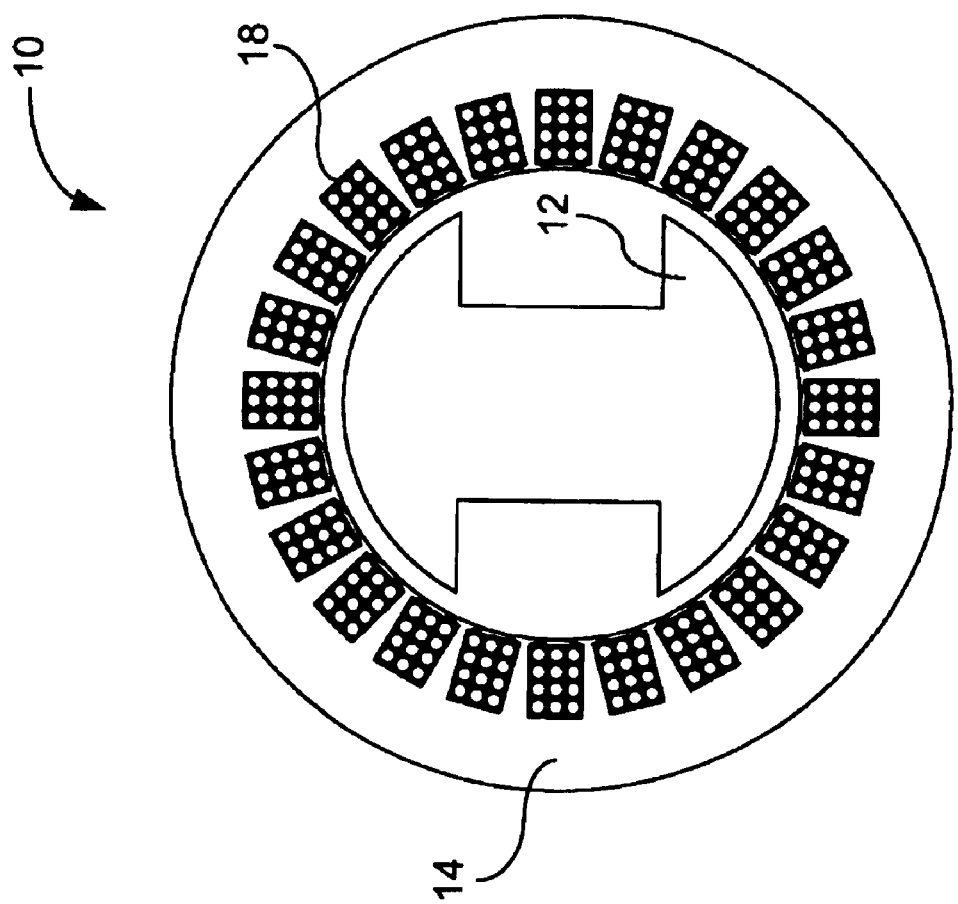
FIG. 1 shows a cross section of a known brushless permanent magnet motor.
Figure 2:
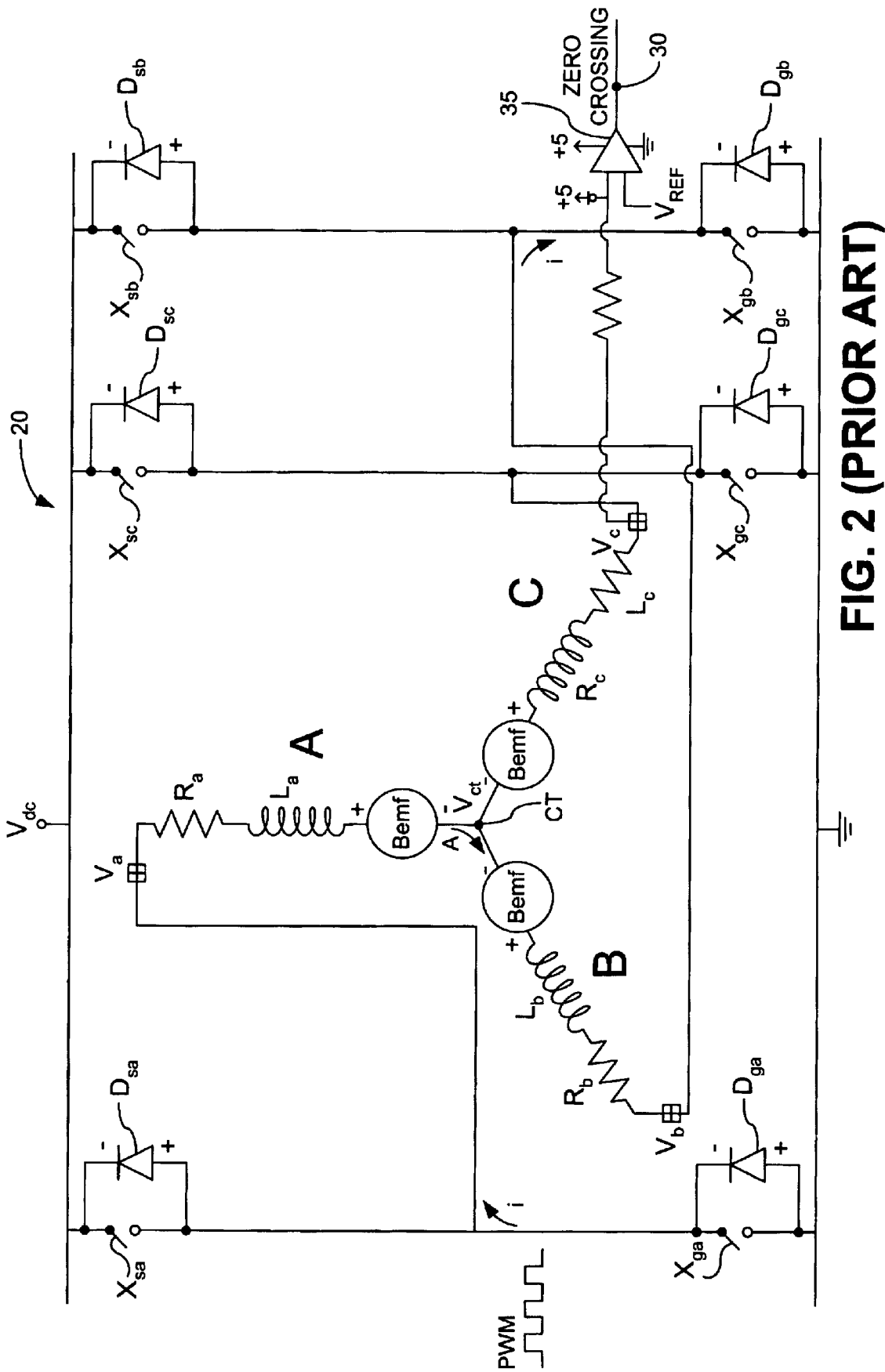
FIG. 2 shows a schematic diagram of a known circuit for controlling the motor of FIG. 1.

Referring initially to FIG. 2, there is shown an electrical schematic diagram of a conventional motor 20 having three coils A, B, and C connected in a "Y" configuration. As will be described in more detail below, the present invention provides an improved method and apparatus for advancing the commutation sequences of the motor 20 by monitoring for zero-crossings during PWM-off states. During such PWM-off states, a precondition circuit 50, (FIG. 4) is used to offset variances in BEMF detection which occur due to a non-zero center tap voltage $V_{CT}$. Further, the precondition circuit 50 may be used to sharpen a coil tap voltage near the zero-crossing. While the precondition circuit 50 is useful in any brushless DC motor application, it finds particular benefit in low speed and/or low voltage motor applications as discussed in more detail below.

The motor 20 comprises three phases or coils A, B. C. Each phase has a respective inductor La, Lb, Lc and line resistance Ra, Rb, Rc. The three phases may be connected in a star ("Y") configuration having a center tap CT, or in a delta configuration. The invention may be applied to either. For each coil, a pair of switches Xsa, Xga, Xsb, Xgb, Xsc, Xbc (collectively "switch(s) X") connect a free end of a coil (also referred to as a coil tap) at Va, Vb, Vc, to supply Vs and GND voltages respectively. The switches are typically power transistors such as Mosfets or the like. A reverse biased diode Dsa, Dga, Dsb, Dgb, Dsc, Dgc (collectively "diode(s) D") is placed in parallel with each of these switches. The diodes are power rectifiers, and typically serve to protect the switches and windings against induced voltages exceeding the supply or ground voltage. As described in more detail below, during PWM-off states, the voltage drop across the diodes D has been found to cause the center tap voltage $V_{CT}$ to deviate from zero which, in turn, creates undesirable variances in the measurement of the BEMF.

Continuing to refer to FIG. 2, it will be described below, by way of example, how the diodes D deviate the center tap voltage CT from zero during a PWM-off state. For this example, is presumed that the motor 20 is in its first phase of a six-phase commutation sequence, wherein current flows from phase A to phase B, while phase C is left floating. Further, it is presumed preferably that during the PWM-off state, the PWM signal does not turn on the switch Xga coupling phase A to ground. In this manner, during the PWM-off state, all of the current freewheeling from phase A to phase B passes through diode Vdga. By not turning on, during the PWM-off state, the switch that couples the high phase (e.g. the phase "from" which current is flowing in a given commutation phase) to ground, there is reduced switching loss and noise introduced into the motor 20. It will be appreciated, however, that the present invention may be applied to motors which turn on the switch (e.g. Xga) coupling the high phase to ground during PWM-off periods, except that in such circumstances the precondition circuit 50 is appropriately adjusted to take into account the fact that all of the current during the freewheeling period is not passing through the diode (e.g. Dga) alone.

In view of the above assumptions, and by way of example, the following equations can be derived from FIG. 2:
From Phase A:

$$V_{CT}=0-V_{Dga}-R_a i-L_a di/dt-Bemf_a \quad (1)$$

Where:
$V_{CT}$ is the voltage at the center tap CT;
$V_{Dga}$ is the voltage across the diode Dga
Ra is the resistance of resistor Ra
i is the current
La is the inductance of the inductor La
$Bemf_a$ is the BEMF induced in phase A.
From Phase B:

$$V_{CT}=V_{Xgb}+R_b i+L_b di/dt-Bemf_b \quad (2)$$

Where:
$V_{Xgb}$ is the voltage across switch Xgb
Rb is the resistance of resistor Rb
i is the current
Lb is the inductance of inductor Lb;
$Bemf_b$ is the BEMF induced in phase B
Adding (1) and (2):

$$2V_{CT}=V_{xgb}-V_{Dga}-(Bemf_a+Bemf_b) \quad (3)$$

Solving for $V_{CT}$:

$$V_{CT} = \frac{V_{Xgb} - V_{Dga}}{2} - \frac{Bemf_a + Bemf_b}{2} \quad (4)$$

Also, from a three phase balanced system $$Bemf_a+Bemf_b+Bemf_c=0 \quad (5)$$

Combining equations (4) and (5), $V_{CT}$ equals:

$$V_{CT} = \frac{V_{Xgb} - V_{Dga}}{2} + \frac{Bemf_c}{2} \quad (6)$$

From FIG. 2, the phase C coil tap voltage Vc equals:

$$V_c=Bemf_c+V_{CT} \quad (7)$$

As can be seen from equation (7), in this example, the coil tap voltage Vc is equal to the BEMF for phase C only when $V_{CT}$ is zero. Combining equations (6) and (7):

$$Vc = \frac{3}{2}Bemf_c + \frac{V_{Xgb} - V_{Dga}}{2} \quad (8)$$

If the last term of equation (8) is ignored, the coil tap voltage Vc is directly proportional to the BEMF for that phase. However, especially at low speeds and low voltages, the BEMF itself is very small. Accordingly, the last term of equation (8) plays a significant role. For low voltage switches X such as those typically used in brushless motor 20, the internal resistance of the switch is also very small, often in the order of 10 milli ohms. In such cases, $V_{Xgb}$ can be ignored, so equation (8) can be re-written as follows:

$$Vc = Bemf_c + V_{CT} = \frac{3}{2}Bemf_c - \frac{V_{Dga}}{2} \quad (9)$$

As can be seen from equation (9) the coil tap voltage Vc is proportional to the BEMF in phase C with the exception of one-half the voltage across diode $V_{Dgn}$. Accordingly, as will be described in more detail below, the precondition circuitry 50 of the present invention provides circuitry for adjusting or offsetting the effect of the diode D.

Figure 3:
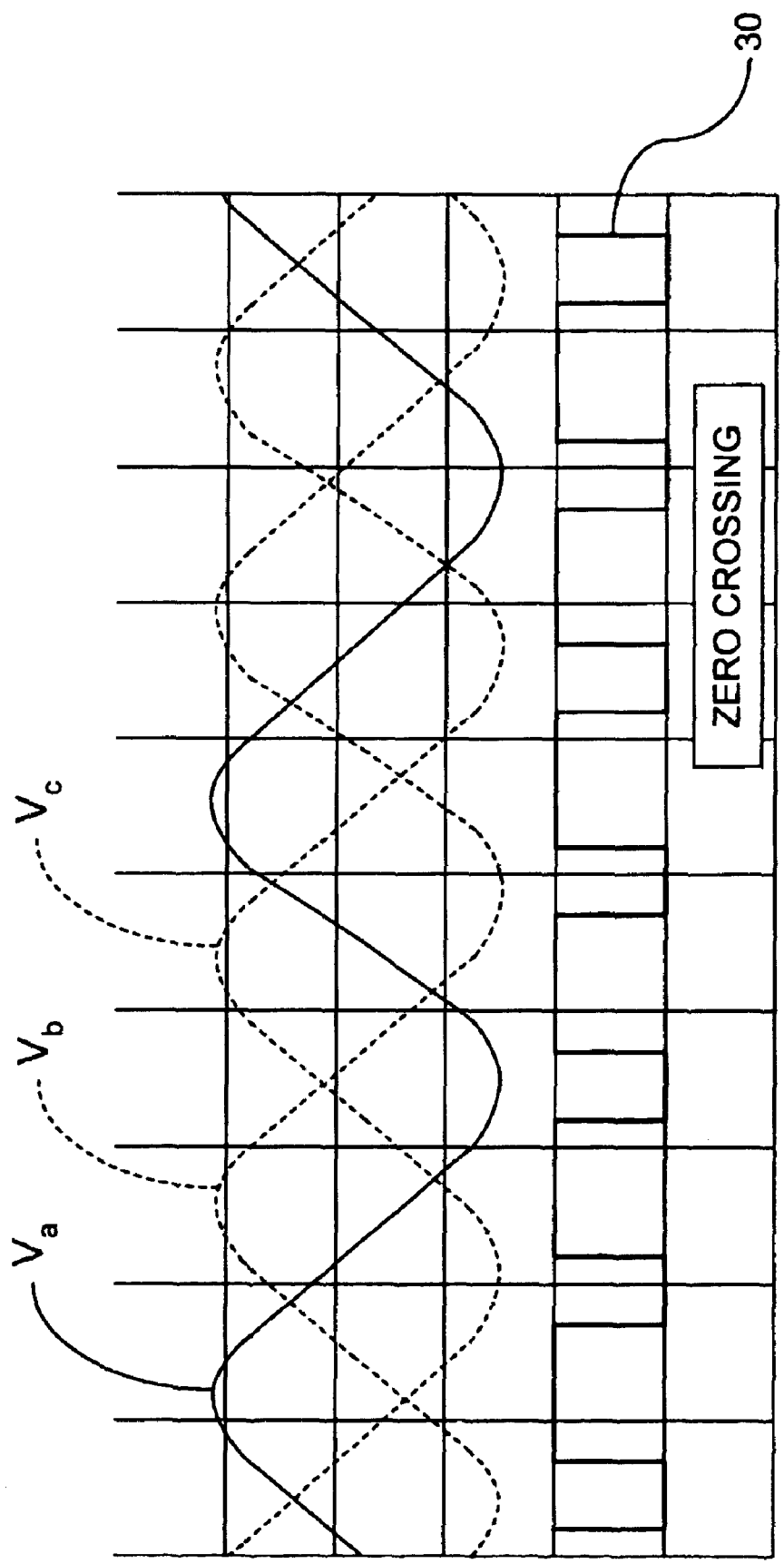
FIG. 3 is a theoretical diagram depicting the voltages and zero-crossings detected in each of three phases of the circuit shown in FIG. 2 with the PWM signal removed.

Referring now to FIG. 3, a theoretical graphical representation of the zero-crossing detection is depicted in a motor 20 which does not include the precondition circuitry 50. The graph of FIG. 3 shows theoretical data presuming, for sake of simplicity, the high frequency PWM signal has been removed. Ideally, zero-crossings of each phase A, B, C of the motor 20 would be distributed evenly in 60 degree intervals. However, without the precondition circuitry 50, the detection of the zero-crossing for each phase A, B, C is shown to be unsymmetrical due to the effect of the diodes D during the PWM-off states. More particularly, as shown in FIG. 3, each time the coil tap voltage Va, Vb, Vc of phases A, B, C cross the zero voltage line, a zero-crossing signal 30 is shown to transition from high-to-low or low-to-high. Due to the effect of the diodes D as indicated by equation (9) above, the zero-crossing signal 30 does not transition in equal 60 degree intervals.

Referring briefly back to FIG. 2, in systems not having the precondition circuitry 50, the zero-crossing signal 30 was typically obtained by comparing the floating phase coil tap voltage, e.g. voltage Vc, with a reference voltage Rref by way of a comparator 35. While for sake of example only phase C is shown to be coupled to a comparator 35 for detecting zero-crossings, it will be appreciated that each phase A, B, C is coupled to a comparator for this purpose. Especially in low voltage and/or low frequency applications, it has been determined that because the slope of change of the coil tap voltage Va, Vb, Vc as it approaches zero-crossing may be very gradual, accurately detecting the time a zero-crossing actually occurs can be difficult. In particular, with a gradual change in coil tap voltage around zero-crossing the actual timing of the zero-crossing is often difficult to determine in view of the inherent standard deviation/offset of the comparator 35. Accordingly, as a further feature of the present invention, the precondition circuitry 50 discussed below optionally includes a sharpening feature for sharpening the signal output from the coil tap prior to performing zero-crossing detection. In this manner, the standard deviation/offset of the comparator 35 will less significantly effect zero-crossing detection especially for low speed and/or low voltage applications.

Figure 4A:
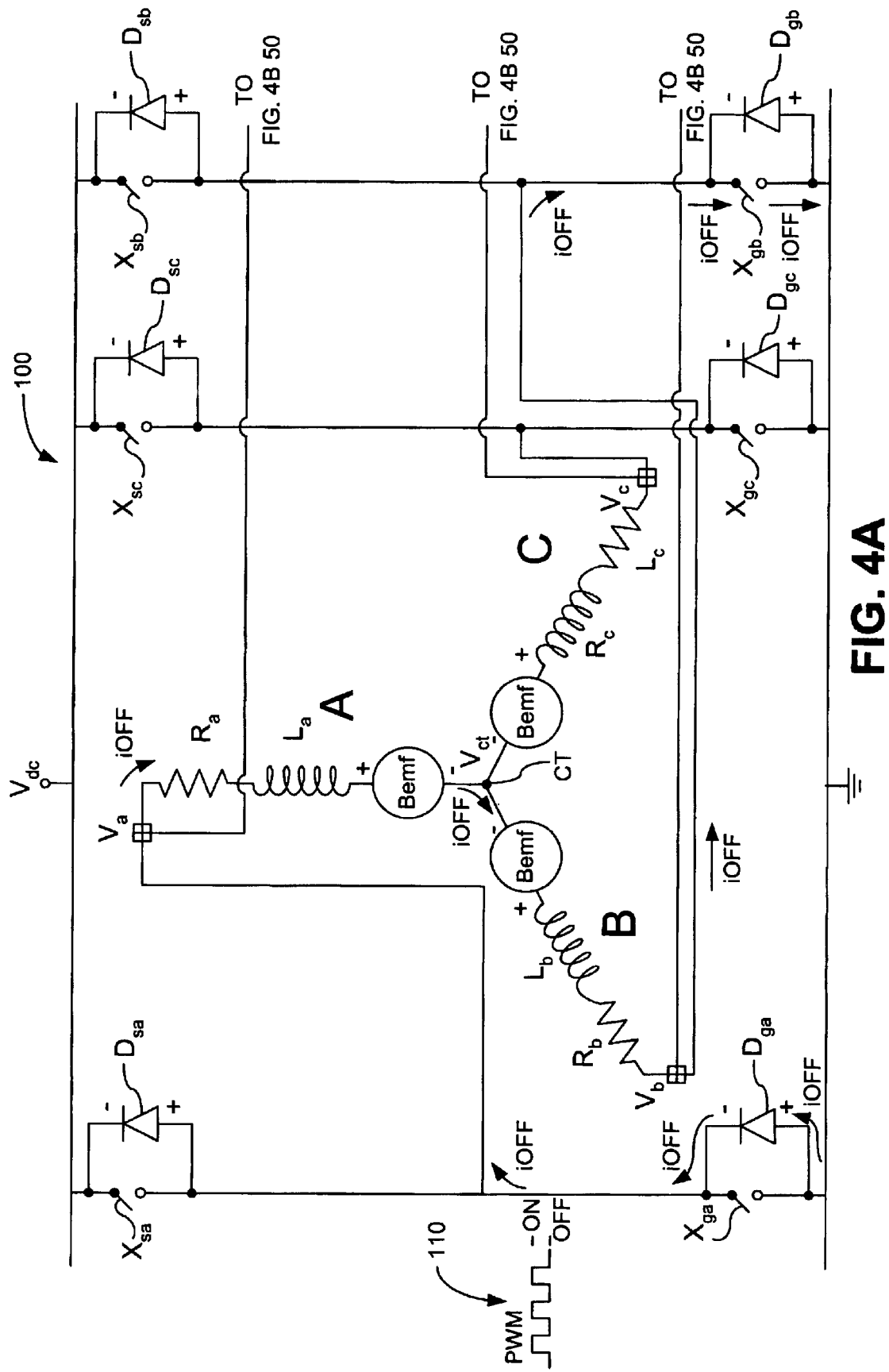
FIG. 4 is a schematic diagram of a circuit for controlling a motor in accordance with one embodiment of the present invention.
Figure 4B:
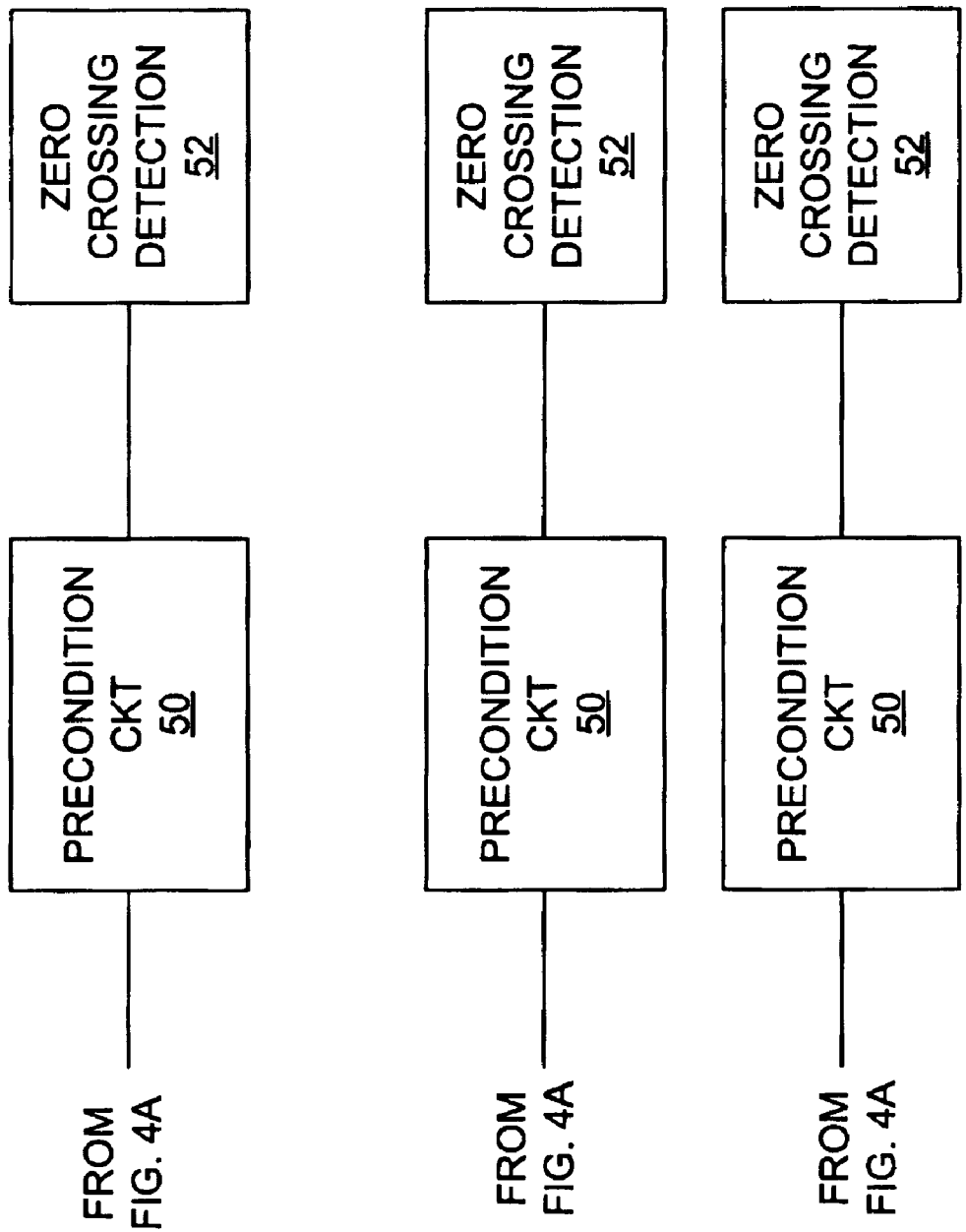

Referring now to FIG. 4, a driver circuit for a blushless DC motor 100 of the present invention is depicted. The motor 100 is substantially similar to the motor 20 described above with reference to FIG. 2 and therefore common elements will not again be discussed. However, in addition to the elements described above, the motor 100 of the present invention includes precondition circuits 50 coupled to the coil tap voltage Va, Vb, Vc for each phase. As described in detail below, the precondition circuit 50 includes circuitry for offsetting or compensating the coil tap voltage Va, Vb, Vc from the effect of the diodes D and for sharpening the coil tap voltage Va, Vb, Vc prior to zero-crossing detection. An output of the precondition circuits 50 is coupled to a zero-crossing detection circuit 52. The zero-crossing detection circuit 52 may, for example, take the form of the comparator 35 described above with reference to FIG. 2 or other known circuits for detecting zero-crossings.

Figure 5:
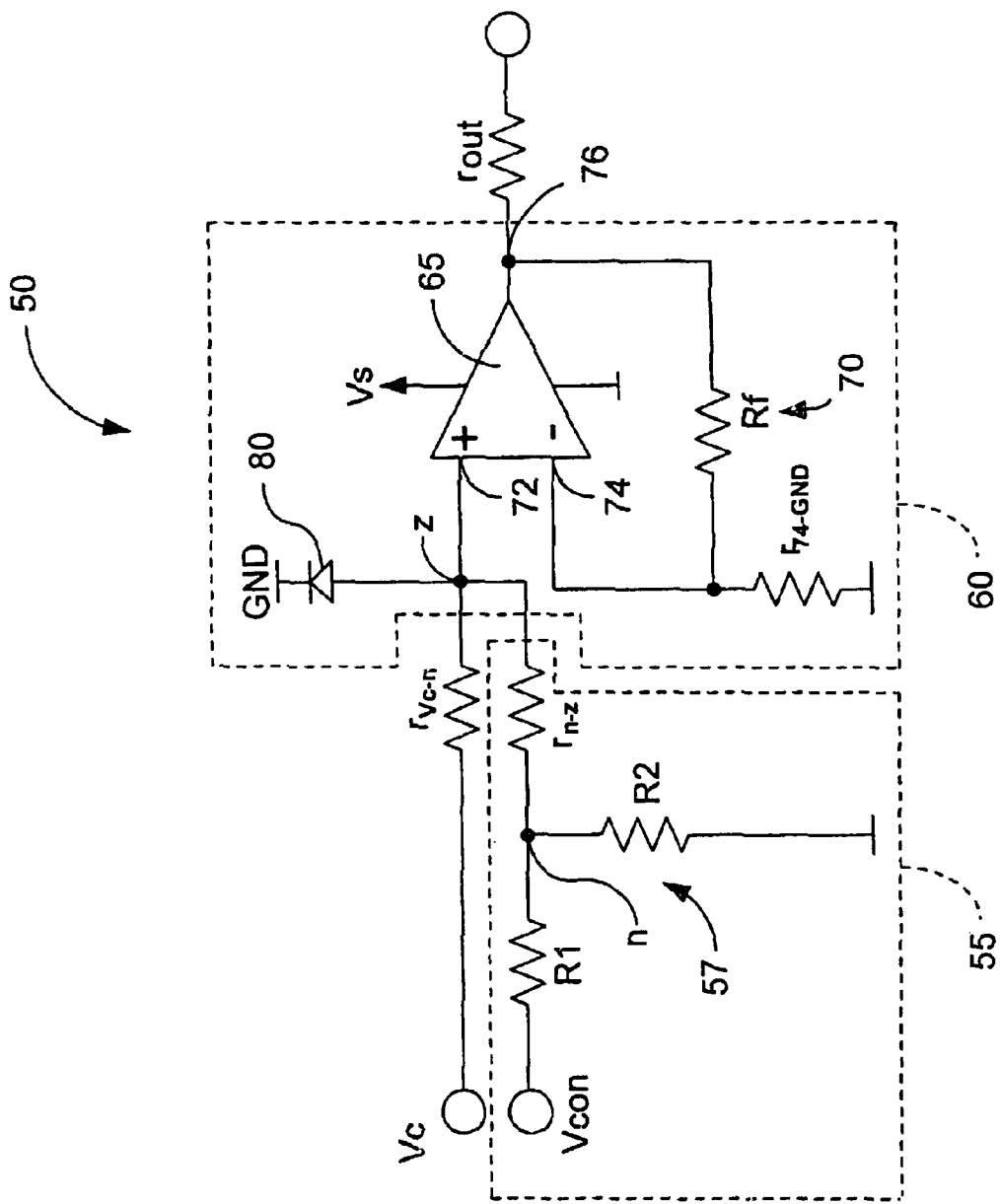
FIG. 5 is a schematic diagram of one embodiment of a preconditioning circuit of the present invention.

Referring now to FIG. 5, the precondition circuit 50 of one embodiment of the present invention is depicted. For sake of example, the precondition circuit 50 shown in FIG. 5 is that of phase C. However, it will be appreciated that similar precondition circuits 50 are coupled to phases A and B as shown in FIG. 4. The precondition circuit 50 of the present embodiment preferably includes offset circuitry 55 and sharpening circuitry 60. The offset circuit 55 includes circuitry for offsetting from the coil-tap voltage, the voltage effect from the diode D so that the coil-tap voltage is substantially directly proportional to the BEFM. The sharpening circuit 60 includes circuitry for enhancing the coil-tap voltage as the coil-tap voltage approaches zero-crossing. Thus, the sharpening circuit 60 allows the comparator 35 which receives the output from the precondition circuit 50 to more clearly detect a zero-crossing. In this example, the coil-tap voltage Vc is inputed to the precondition circuit 50 and coupled to node Z through a current limiting resistor $r_{Vc-z}$.

Continuing to refer to FIG. 5, in order to offset from the coil-tap voltage Vc, the effect from the diode Dga, the offset circuitry 55 includes a voltage divide circuit 57. In the present example, the voltage divide circuit 57 includes a first resistor R1 coupled between common node n and constant supply voltage Vcon, and a second resistor R2 coupled between the common node n and ground. For this example, R1 and R2 are chosen such that voltage at common node n=Vcon*R2/(R1+R2)=$V_{Dga}$/2. The voltage at common node n is then coupled to node Z through a current limiting resistor $r_{n-z}$, thereby serving as an additive component to the coil-tap voltage Vc for purposes of offsetting the effect of the diode Dga. In this manner, the second term of equation (9) (discussed above with reference to FIG. 2) may be offset such that the phase C coil-tap voltage Vc is made substantially directly proportional to the BEFM. For the present example, the voltage drop $V_{Dga}$ across the diode Dga during a freewheeling period is referred to as $V_{Dga-fw}$. Accordingly, in accordance with readily known techniques in the art, Vcon, R1 and R2 are selected such that the voltage divide circuit 57 provides a voltage substantially equal to ½ $V_{Dga-fw}$. In this manner, the offset circuit 55 is able to add back to the coil-tap voltage Vc at node Z, a constant voltage which substantially eliminates the effect of the diode Dga. In turn, the coil-tap voltage Vc is adjusted prior to zero-crossing detection so as to be substantially directly proportional to the BEMF.

It will be appreciated that while values for Vcon, R1 and R2 are shown above for sake of example, other values could have been chosen so as to achieve a similar result. Further, it will be appreciated that while the offset circuit 55 above is shown to be formed of a voltage divide circuit, the present invention is intended to cover any circuit configuration which serves to offset the value of the diode D and is not limited to a voltage divide circuit. Additionally, as mentioned above, in the present example during a PWM-off state, the switch Xga in the high phase is not turned on in order to minimize switching loss and noise. Thus, in the example leading to equation (9) the effect of the diode D was shown to be $V_{Dga}$/2. It will be appreciated, however, that the present invention is suitable for use in other motor configurations where, for example, the ground switch (e.g. Xga) for the high phase is turned on during a PWM-off state. In such cases, the effect of the diode on the coil tap voltage will differ from the $V_{Dga}$/2 described in the above example. Accordingly, in such alternative embodiments, the offset circuit 55 is correspondingly adjusted to offset the effect of the diode D by an appropriate amount as can be readily determined by one in the art.

Continuing to refer to FIG. 5, the sharpening circuit 60 will now be described in more detail. The sharpening circuit 60 is shown to include an operational amplifier 65 having a negative feedback loop 70. A non-inverting input 72 to the amplifier 65 is coupled to node Z. An inverting input 74 to the amplifier 65 is coupled to an output 76 of the amplifier 65 through resistor Rf. The inverting input 74 is also coupled to ground through current limiting resistor $r_{74-GND}$. As will be discussed in more detail below, the output of the amplifier 65 is coupled to an input of the zero-crossing detection circuit 52 through a current limiting resistor $r_{out}$.

In the present example, a gain of the amplifier 65 is preferably set to provide a gain or sharpening to the offset coil-tap voltage of any desired value greater than one. The negative feedback loop 70 controls the gain of the amplifier 65 to equal $1+Rf/r_{74-GND}$ in the present example. Thus, once a desired gain is selected, say for example a gain of ten, the values of Rf and $r_{74-GND}$ are selected to provide the desired gain in a manner readily known in the art. As discussed above, the gain may be set to any desired value and the present invention is not limited to any particular value or range.

In addition to the amplifier 65 and associated circuitry described above, the sharpening circuit 60 further includes a clamping diode 80 coupled between the non-inverting input 72 of amplifier 65 and ground. The purpose of the clamping diode 80 is to protect the amplifier 65 from saturating. More particularly, the clamping diode 80 limits the maximum voltage introduced to the amplifier 65 to approximately 0.7 volts, which is the voltage drop across the clamping diode 80. With an amplifier gain in the range of 10–15, the output 76 of the amplifier 65 will not exceed, for example, 7 volts–10.5 volts. With a source voltage Vs for the amplifier 65 set at, for example, 15 volts the clamping diode 80 ensures that the amplifier 65 does not amplify a signal beyond its 15 volt saturation point. Further, as the output 76 of the amplifier 65 is primarily used for zero-crossing detection, truncating voltages introduced to the amplifier 65 which are outside of the range clamped by the clamping diode 80 does not effect motor performance.

In operation, the present invention provides enhanced zero-crossing detection for brushless DC motors as will now be described with reference to FIGS. 4 and 5. The motor 100 is driven by way of a PWM signal 110 which is applied to the motor 100 in one of several conventional manners. For example, in one embodiment, during PWM-on states the high switch (e.g. Xsa, Xsb, Xsc) for the "from" phase of the commutation sequence and the ground switch (e.g. Xga, Xgb, Xgc) for the "to" phase of the commutation sequence are turned on. During the following PWM-off state, the high switch in the "from" phase is turned off and all of the freewheeling current is allowed to pass through the diode (e.g. Dga, Dgb, Dgc) in the "from" phase to ground through the ground switch in the "to" phase. Such a current path during the PWM-off state is representatively depicted in FIG. 4 by current path $i_{off}$. By not turning on the ground switch in the "from" phase during the PWM-off state, it is possible to avoid switching delays and noise. However, it will be appreciated that the present invention is suitable for motors 100 which operate in any switching mode.

The motor 100 of the present embodiment, advantageously monitors for zero crossing detections during PWM-off states. Because a PWM signal typically oscillates at a frequency significantly greater than the frequency at which the commutation sequence advances, zero-crossings which may happen to occur during a PWM-on state are still detectable during the PWM-off state with minimal delay. For example, the frequency of the PWM signal may be in the range of 120 kHz–100 kHz while the frequency at which the commutation sequence advances is typically on the order of 100 Hz. Further, by performing zero-crossing detection during PWM-off states, filters and delays associated with offsetting the center tap voltage CT during PWM-on states are avoided.

During PWM-off states, zero crossing detection occurs by initially providing the coil-tap voltage Va, Vb, Vc for the floating phase to the precondition circuit 50. The precondition circuit 50 then offsets the coil-tap voltage for the effect of the diode D so that the coil-tap voltage is more closely proportional to the BEMF for that phase. For instance, in the present example, the precondition circuit 50 adjusts the floating phase coil-tap voltage by an amount substantially equal to an amount by which the voltage at the center tap $V_{CT}$ is deviated from zero as discussed above with reference to equations (8) & (9). Further, the precondition circuit 50 sharpens or amplifies the offset coil-tap voltage so as to enhance the signal as it approaches zero-crossing. In this particular example, the precondition circuit 50 passes the offset coil-tap voltage through amplifier 65 having a gain of 11. The amplifier is preferably clamped by a clamping diode 80 so to avoid saturation of the amplifier 65 as discussed in more detail above.

Following the offset and signal enhancement stages of the precondition circuit 50, the output of the precondition circuit is provided to the zero-crossing detection circuit 52. The zero-crossing detection circuit 52 may, for example, include a comparator for comparing the output of the precondition circuitry with a reference voltage to determine when a zero-crossing has occurred. As the precondition circuit 50 of the present invention has adjusted the coil-tap voltage for variations introduced by the diode D, the offset coil-tap voltage is more closely proportional to the BEMF. Further, as the offset coil-tap voltage is further sharpened prior to performing a zero-crossing detection, offsets inherent in, for example, the comparator used in the zero-crossing detection circuit 52, less significantly effect proper zero-crossing detection. Thus, zero-crossing detection is made more accurate especially for low voltage and/or low speed applications where the effect of the diode and offset in the zero-crossing detection circuit are more pervasive.

Figure 6:
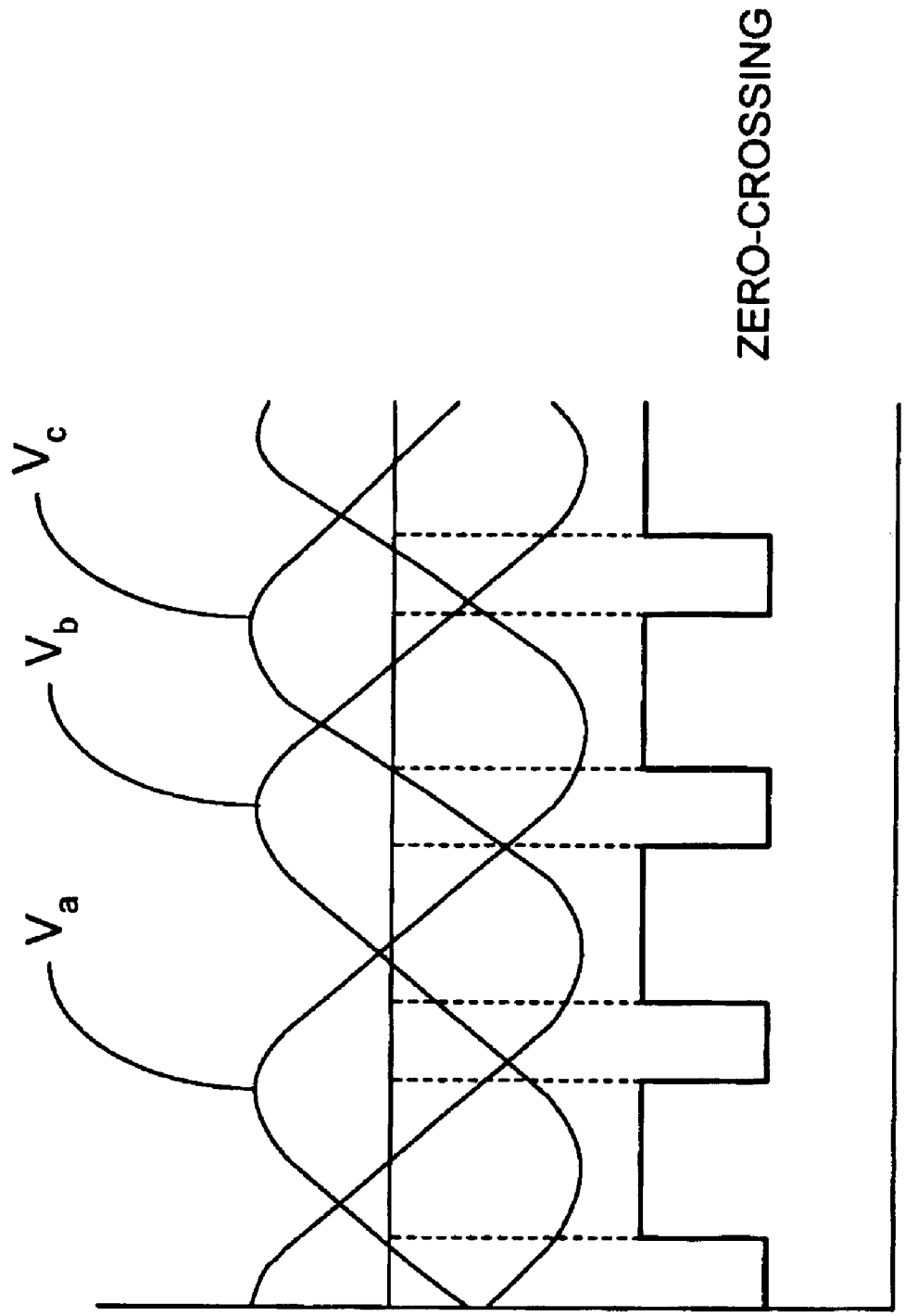
FIG. 6 is a theoretical diagram depicting the voltages and zero-crossings detected in each of the three phases of the circuit shown in FIG. 4 with the PWM signal removed.

Referring briefly to FIG. 6, there is shown a theoretical graph with the adjusted coil-tap voltages Va, Vb, Vc and resulting output from the zero-crossing detection circuit 52 in a motor utilizing the preconditioning circuit 50 discussed herein. For sake of simplicity, the theoretical data shown in FIG. 6 presumes the high frequency PWM signal is removed. As shown, with the preconditioning circuit 50, the output of the zero-crossing detection circuit 52 which controls advancement of the commutation sequence of the motor is substantially close to having the desired 60-degree switching intervals. Accordingly, the present invention provides for smoother switching through the commutation sequence which in turn provides a more efficient motor which is less likely to jitter or stall.

Although the invention has been shown and described with respect to certain preferred embodiments, it is obvious that equivalents and modifications will occur to others skilled in the art upon the reading and understanding of the specification. For example, although the embodiment described above shows that the precondition circuitry 50 performs an offset to the coil tap voltage Va, Vb, Vc prior to amplifying the signal, the precondition circuit 50 may have alternatively been designed so as to perform an amplification first followed by an appropriately adjusting an offset. Alternatively, to the extent that only an offset or a sharpening of the coil tap voltage is desired, the precondition circuit 50 may include only one of these two features. Further, although a diode 80 was shown to clamp the voltage input to the amplifier 65, alternative clamping means could have been used. Still further, while a voltage divide circuit 57 was shown to be utilized in the offset circuit 55 to compensate for the effect of the diode D, it will be appreciated that alternative offset voltage circuit could have been used, including for example a direct application of the desired offset voltage to the non-inverting input of the amplifier 65. Yet still further, while the precondition circuits 50 and zero-crossing detection circuits 52 are depicted as separate components for each phase, it will be appreciated that such circuitry may be combined into fewer circuits and/or fully consolidated without departing from the spirit or scope of invention. The present invention includes all such equivalents and modifications, and is limited only by the scope of the following claims.

What is claimed is:

1. A driver circuit for a brushless motor having a first coil coupled between a first coil tap and a center tap, a second coil coupled between a second coil tap and the center tap, and a third coil coupled between a third coil tap and the center tap, the driver circuit operating in a pulse width modulation (PWM) mode having a PWM-on state and a PWM-off state, the driver circuit comprising:

a precondition circuit configured to receive, during a PWM-off period, a floating phase coil tap voltage from one of the first coil tap, the second coil tap and the third coil tap, the precondition circuit configured to precondition the floating phase coil tap voltage for zero-crossing detection by reducing an undesired component from the floating phase coil tap voltage; and zero-crossing detection circuitry configured to receive the preconditioned floating phase coil tap voltage and determine when a zero-crossing event has occurred.

2. The driver circuit of claim 1, wherein the precondition circuit includes an offset circuit configured to adjust the floating phase coil tap voltage by an amount substantially equal to an amount of voltage by which a voltage at the center tap is deviated from zero, whereby an offset floating phase coil tap voltage is produced.

3. The driver circuit of claim 2, wherein the precondition circuit further includes a sharpening circuit for increasing a signal strength of the offset floating phase coil tap voltage.

4. The driver circuit of claim 3, wherein the sharpening circuit includes an operational amplifier.

5. The driver circuit of claim 4, wherein the operational amplifier includes a negative feed-back loop and provides a gain greater than one.

6. The driver circuit of claim 4, wherein the sharpening circuit includes a clamping circuit, the clamping circuit configured to prevent saturation of the operational amplifier.

7. The driver circuit of claim 6, wherein the clamping circuit includes a diode coupled between a non-inverting input to the operational amplifier and ground.

8. The driver circuit of claim 2, wherein the offset circuitry includes a voltage divider circuit.

9. The driver circuit of claim 2, wherein the zero-crossing detection circuitry includes a comparator.

10. The driver circuit of claim 1, wherein the precondition circuit includes a sharpening circuit for increasing a signal strength of the floating phase coil tap voltage.

11. A method for determining when to advance in a commutation sequence of a brushless DC motor, the motor including a first phase having a first coil coupled between a first coil tap and a center tap, a second phase having a second coil coupled between a second coil tap and the center tap, and a third phase having a third coil coupled between a third coil tap and the center tap, the method comprising the steps of:

providing to the motor a pulse width modulation (PWM) signal having a PWM-on state and a PWM-off state;

during the PWM-off state, supplying a floating phase coil tap voltage from a floating one of the first, second and third phases of the motor to a preconditioning circuit;

preconditioning the supplied floating phase coil tap voltage by substantially removing an undesired component;

monitoring the preconditioned supplied floating phase coil tap voltage for a zero-crossing; and following a zero-crossing detection, advancing a step in the commutation sequence of the motor.

12. The method of claim 11, wherein the step of preconditioning includes the step of compensating the floating phase coil tap voltage for an amount of voltage substantially equal to an amount of voltage by which a voltage at the center tap is deviated from zero, whereby an offset floating phase coil tap voltage is produced.

13. The method of claim 12, wherein the step of preconditioning further includes the step of amplifying the offset floating phase coil tap voltage.

14. The method of claim 13, wherein the step of amplifying amplifies the offset floating phase coil tap voltage with a predetermined gain greater than 1.

15. The method of claim 13, wherein the step of amplifying is limited to amplifying the offset floating phase coil tap voltage falling within a predetermined voltage range.

16. The motor of claim 11, wherein the motor operates with a commutating frequency of 100 Hz or less.

17. The method of claim 11, wherein the step of monitoring for a zero-crossing detection includes a comparison of a voltage output from the preconditioning circuit with a reference voltage.

18. The method of claim 11, wherein following zero-crossing detection, the commutation sequence advances by 30 electrical degrees.

19. A motor having a plurality of coils coupled together in one of a delta or wye configuration, each of the coils coupled at one end, through a respective coil tap, to both a source voltage and ground via selectively actuateable switches, each of the switches having a diode coupled in parallel with the respective switch, the motor comprising:

a preconditioning circuit, the preconditioning circuit configured to adjust a voltage received from an associated one of the coil taps by an amount of voltage substantially equal to an amount of voltage by which the diodes offset a voltage at the center tap from zero; and a zero-crossing detection circuit coupled to the precondition circuit for receiving a signal output from the preconditioning circuit and monitoring the signal to detect a zero-crossing.

20. The motor of claim 19, wherein the preconditioning circuit further includes circuitry for sharpening the adjusted coil tap voltage.

21. The motor of claim 20, wherein the circuitry for sharpening the adjusted coil tap voltage includes an operational amplifier.

22. The motor of claim 21, wherein the sharpening circuit further includes a clamping circuit, the clamping circuit configured to prevent saturation of the operational amplifier.

23. The motor of claim 22, wherein the clamping circuit includes a diode coupled between a non-inverting input to the operational amplifier and ground.

24. The motor of claim 19, wherein the motor operates in a pulse width modulation (PWM) mode having PWM-on states and PWM-off states.

25. The motor of claim 24, wherein the preconditioning circuit is configured to adjust the coil tap voltage during PWM-off states.

26. The motor of claim 19, wherein the preconditioning circuit includes a voltage divider circuit.

\* \* \* \* \*